United States Patent
Nozawa et al.

(10) Patent No.: US 7,129,168 B2
(45) Date of Patent: Oct. 31, 2006

(54) METHOD OF ESTIMATING SUBSTRATE TEMPERATURE

(75) Inventors: Katsuya Nozawa, Osaka (JP); Tohru Saitoh, Osaka (JP); Teruhito Ohnishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 497 days.

(21) Appl. No.: 10/691,500

(22) Filed: Oct. 24, 2003

(65) Prior Publication Data

US 2006/0126701 A1    Jun. 15, 2006

Related U.S. Application Data

(63) Continuation of application No. PCT/JP02/11250, filed on Oct. 30, 2002.

(51) Int. Cl.
  *H01L 21/44* (2006.01)
(52) U.S. Cl. ........................ 438/680; 438/933
(58) Field of Classification Search ............... 438/680, 438/933, 931, 723, 743, 752, 753, 788, 792, 438/795, 660
See application file for complete search history.

(56) References Cited

U.S. PATENT DOCUMENTS

| | | | |
|---|---|---|---|
| 4,109,271 A | * | 8/1978 | Pankove ...................... 357/30 |
| 4,126,150 A | * | 11/1978 | Bell et al. ..................... 136/89 |
| 4,216,501 A | * | 8/1980 | Bell ........................... 369/275.1 |
| 4,442,310 A | * | 4/1984 | Carlson et al. ............. 136/256 |

FOREIGN PATENT DOCUMENTS

| | | |
|---|---|---|
| EP | 1 098 372 A2 | 5/2001 |
| JP | 63-19869 | 1/1988 |
| JP | 7-302766 | 11/1995 |
| JP | 11-243061 | 9/1999 |
| JP | 2001-189279 | 7/2001 |
| JP | 2001-217430 | 8/2001 |
| JP | 3269463 | 1/2002 |
| JP | 2002-43227 A | 2/2002 |
| JP | 2002-64105 | 2/2002 |

\* cited by examiner

*Primary Examiner*—David Nhu
(74) *Attorney, Agent, or Firm*—McDermott Will & Emery LLP

(57) ABSTRACT

A method of estimating substrate temperature according to this invention includes the steps of epitaxially growing a Si-containing layer (103) on a SiGe layer (102) formed on a substrate for temperature estimation (101) constituted of a Si substrate under a reaction control condition; finding a relationship between a rate of growth of the Si-containing layer and a substrate temperature of the substrate for temperature estimation; epitaxially growing a Si-containing layer on a substrate for device fabrication as a subject of substrate temperature estimation under a reaction control condition; and estimating a substrate temperature of the substrate for device fabrication based on the rate of growth of the latter Si-containing layer and the relationship between the rate of growth of the former Si-containing layer (103) and the substrate temperature of the substrate for temperature estimation.

12 Claims, 10 Drawing Sheets

METHOD OF ESTIMATING SUBSTRATE TEMPERATURE

This is a continuation application under 35 U.S.C.111(a) of pending prior International Application No. PCT/JP02/11250, filed on Oct. 30, 2002.

BACKGROUND OF THE INVENTION

1. Field of the Invention

The present invention relates to a method of estimating a surface temperature of a substrate during epitaxial growth of a semiconductor layer on the substrate in a semiconductor device fabrication process.

2. Description of the Related Art

In recent years, there have been developed high-performance semiconductor devices so-called heterostructure devices such as hetero bipolar transistors (hereinafter referred to as "HBTs"). Such a heterostructure device is fabricated by epitaxial growth of a crystal that is different from the substrate. The use of such epitaxial growth technology makes it possible to stack thin crystal films that are different in physical properties from each other with a high precision of the order of about a mono atomic layer to several nanometers.

In the fabrication of such a heterostructure device, control of the film thickness and composition ratio profile of an epitaxial layer is critical. This is because, without such control, volume production of heterostructure devices exhibiting desired characteristics would be impossible. The thickness and composition profile of the epitaxial layer are determined by epitaxial growth conditions. Therefore, in volume production of heterostructure devices, it is necessary to reproduce growth conditions that have been previously confirmed to provide such devices with desired characteristics.

Conventionally, the CVD (Chemical Vapor Deposition) process has been widely used. In this process, epitaxial growth is performed by supplying a vapor (source gas) as a material for growth into a growth chamber in which a heated substrate is placed to cause a chemical reaction to occur between the source material molecule and the material of the substrate on the substrate surface. In the case of the CVD process, the composition ratio of a crystalline thin film of a mixed crystal material such as SiGe (silicon germanium) can be controlled by adjusting the mixing ratio between plural kinds of source gases to be supplied.

The CVD process causes epitaxial growth to proceed by the chemical reaction between the material of the substrate on the substrate surface and the source material molecule as described above and, hence, the rate of growth is susceptible to the temperature of the portion where reaction proceeds. In the case of the UHV-CVD (Ultra High Vacuum Chemical Vapor Deposition) process employed for epitaxial growth of an SiGe mixed crystal, in particular, the rate of growth is susceptible to the surface temperature of the substrate. The UHV-CVD process referred to herein is a technique enabling crystal growth to proceed at temperatures as low as about 500° C. to about 600° C. by providing an ultra-high vacuum atmosphere in the crystal growth chamber. Since the crystal growth proceeds under such a low temperature, the UHV-CVD process allows a condition called "reaction control condition" in which the rate of growth is completely controlled by the speed at which the chemical reaction proceeds at the substrate surface and hence hardly depends on the amounts of the source gases supplied. Under the reaction control condition, the rate of growth depends substantially only on the surface temperature of the substrate and hence is sensitive to variation in the surface temperature of the substrate. For instance, where silicon is epitaxially grown on a substrate heated to a surface temperature of about 600° C. by the UHV-CVD process, a variation of only 1° C. in the substrate surface temperature causes the rate of growth to vary as largely as about 3%.

Therefore, in volume production of heterostructure devices by the UHV-CVD process, the substrate temperature is most important among the growth conditions to be reproduced. This is because even if the growth conditions other than the substrate temperature, such as the gas flow rate and growth time are reproduced precisely, a failure to reproduce the substrate temperature results in a grown layer having a film thickness and a composition ratio profile that are different from desired ones, thus making it impossible to fabricate heterostructure devices having desired characteristics.

In volume production of heterostructure devices, usually, a plurality of devices are fabricated on a single substrate and a required number of substrates are subjected to processing. Therefore, in order to fabricate a required number of heterostructure devices with a high yield, making each of the growth conditions uniform in the plane of the substrate and making the growth conditions constant for every substrate are both necessary. Accordingly, it is important in the UHV-CVD process to make the temperature uniformity in the substrate plane higher and make the substrate temperature constant for every substrate.

In reproducing the surface temperature of a substrate, a technique of measuring the surface temperature is needed. That is, if the temperature distribution in the plane of a substrate under epitaxial growth cannot be determined, adjustment to make the temperature in the plane of the substrate uniform is impossible. Further, if the temperatures of respective substrates cannot be measured, it is impossible to reproduce a desired substrate surface temperature.

In semiconductor device fabrication processes, a thermocouple and a pyrometer have been conventionally widely used, in a technique for measuring the surface temperature of a substrate.

The thermocouple is constructed of two kinds of metals joined together and is adapted to measure a temperature by measuring a voltage generated in accordance with a difference in thermoelectromotive force between the metals when the temperature of the joint between the two metals reaches a predetermined value.

However, the thermocouple needs to be placed close to a subject of measurement, i.e. a substrate surface because of its operating principle and hence is not suitable for measurement of the temperature of a substrate surface on which a chemical reaction is proceeding. For this reason, the thermocouple cannot measure the temperature of a part other than the substrate surface such as a heater or the inside of a susceptor and hence is incapable of precise measurement of the temperature of the substrate surface. Further, since the joint between the metals of the thermocouple needs to be connected to a voltmeter through electric wire, multipoint measurement for measuring the temperature distribution in the plane of a substrate requires many interconnecting wires, so that the number of measurement points is limited.

On the other hand, the pyrometer is capable of measuring the temperature of a substrate surface on which a chemical reaction is proceeding since the pyrometer is adapted to measure a temperature by measuring the intensity of electromagnetic wave emitted from a measuring region. To determine an exact temperature from an electromagnetic wave intensity, the physical quantity called emissivity needs to be known. Actually, however, there is a difficulty in measuring the emissivity, which makes it difficult for the pyrometer to measure an exact temperature. Particularly, the emissivity of a substrate provided with a pattern depends greatly on the pattern, the material and thickness of the substrate, and the like. Further, the emissivity of such a substrate provided with the pattern varies with epitaxial growth. For this reason, it is, in effect, impossible to measure the surface temperature of a substrate provided with the pattern with use of the pyrometer during epitaxial growth.

It is, therefore, a conventional practice to control the temperature of the substrate provided with the pattern during epitaxial growth by measuring the temperature of the part other than the substrate surface such as the susceptor and controlling the heater based on the temperature thus measured. Such a conventional practice, however, involves a problem that even though the temperature of the susceptor for example is adjusted to a target temperature, the temperature of the substrate surface does not become equal to the target temperature because the influence of the pattern made of an oxide film and polysilicon on the substrate causes the emissivity, thermal conductivity, heat capacity and the like of the substrate to vary.

In measuring a substrate surface temperature with the pyrometer, a growth apparatus needs to have a window called view port for allowing the substrate surface to be observed. Such a view port raises another problem that the number of measurement points is usually limited to a few points in spite of the need of temperature measurement at many measurement points for measurement of the temperature distribution in the plane of the substrate.

The present invention has been made in view of the foregoing circumstances. It is therefore an object of the present invention to provide a method of estimating substrate temperature which is capable of estimating the surface temperature of a substrate provided with a pattern during epitaxial growth.

Another object of the present invention is to provide a method of estimating substrate temperature which is capable of estimating the temperature distribution in a plane of a substrate by estimating temperatures at plural points in the plane of the substrate.

SUMMARY OF THE INVENTION

With a view to attaining the foregoing objects, the present invention provides a method of estimating substrate temperature comprising the steps of epitaxially growing a first semiconductor layer on a substrate for temperature estimation, the first semiconductor layer being made of a single crystal material having an optical constant that is different from an optical constant of the substrate for temperature estimation, and then epitaxially growing a second semiconductor layer on the first semiconductor layer under a reaction control condition, the second semiconductor layer being made of a single crystal material having an optical constant that is substantially equal to the optical constant of the substrate for temperature estimation and different from the optical constant of the first semiconductor layer; measuring a film thickness of the second semiconductor layer by a method of optical measurement while measuring a surface temperature of the second semiconductor layer; calculating a rate of growth of the second semiconductor layer based on the film thickness of the second semiconductor layer thus measured to derive a relationship between the rate of growth of the second semiconductor layer and the surface temperature of the second semiconductor layer; epitaxially growing a third semiconductor layer on a substrate for device fabrication made of a material identical to a material of the substrate for temperature estimation, the third semiconductor layer being made of a single crystal material having an optical constant that is different from the optical constant of the substrate for device fabrication, and then epitaxially growing a fourth semiconductor layer on the third semiconductor layer under a reaction control condition, the fourth semiconductor layer being made of a single crystal material having an optical constant that is substantially equal to the optical constant of the substrate for device fabrication and different from the optical constant of the third semiconductor layer; measuring a film thickness of the fourth semiconductor layer by a method of optical measurement; calculating a rate of growth of the fourth semiconductor layer based on the film thickness of the fourth semiconductor layer thus measured; and estimating a surface temperature of the fourth semiconductor layer based on the rate of growth of the fourth semiconductor layer thus calculated and the relationship.

In the method of estimating substrate temperature, preferably, the second semiconductor layer and the fourth semiconductor layer are each comprised of a semiconductor layer containing Si.

In the method of estimating substrate temperature, preferably, the second semiconductor layer and the fourth semiconductor layer each further contains Ge.

In the method of estimating substrate temperature, preferably, the second semiconductor layer and the fourth semiconductor layer each further contains C.

In the method of estimating substrate temperature, preferably, the substrate for temperature estimation, the second semiconductor layer, the substrate for device fabrication and the fourth semiconductor layer are each made of Si.

In the method of estimating substrate temperature, preferably, the second semiconductor layer is made of Si, and the first semiconductor layer is made of SiGe.

In the method of estimating substrate temperature, preferably, the first semiconductor layer has a Ge composition ratio not less than 5% and a film thickness equal to or less than a critical film thickness thereof.

In the method of estimating substrate temperature, preferably, the second semiconductor layer is made of Si, and the first semiconductor layer is made of SiGeC.

In the method of estimating substrate temperature, preferably, the film thickness of the second semiconductor layer is measured with use of a spectroscopic ellipsometer.

In the method of estimating substrate temperature, preferably, the film thickness of the second semiconductor layer is measured with use of a spectral reflectometer.

In the method of estimating substrate temperature, it is preferable that: a plurality of fourth semiconductor layers are epitaxially grown on the third semiconductor layer under a reaction control condition; in the step of calculating the rate of growth of the fourth semiconductor layer, rates of growth of at least two of the plurality of fourth semiconductor layers are calculated; and in the step of estimating the surface temperature of the fourth semiconductor layer, surface temperatures of the at least two of the fourth semiconductor layers are estimated based on the rates of growth of the at least two of the fourth semiconductor layers thus calculated.

These and other objects, features and attendant advantages of the present invention will become apparent from the reading of the following detailed description in conjunction with the accompanying drawings.

DETAILED DESCRIPTION OF THE PREFERRED EMBODIMENTS

The present invention will now be described in detail by way of embodiments with reference to the accompanying drawings. In the following description the surface temperature of a substrate is simply referred to as "substrate temperature." Where a semiconductor layer is grown on a substrate, the surface temperature of the growing semiconductor layer is defined as the substrate temperature.

Embodiment 1

The following description is directed to a method of estimating substrate temperature according to the present invention utilized in the fabrication of an HBT as one of heterostructure devices. For easy understanding, the structure of and the fabrication process for an HBT having a SiGe mixed crystal film (hereinafter referred to as "SiGeHBT") will be described first.

Figure 1:
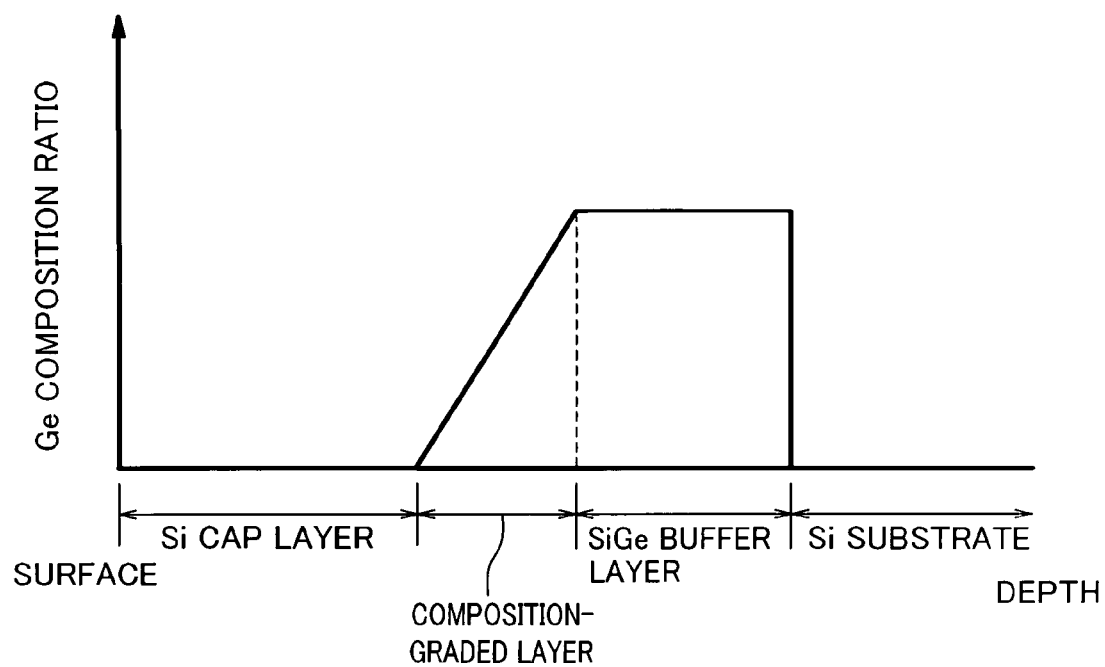
FIG. 1 is a diagram showing a graph of a Ge composition ratio profile in a SiGeHBT.

FIG. 1 is a diagram showing a graph of a Ge composition ratio profile in the SiGeHBT. In FIG. 1, the ordinate axis indicates Ge composition ratio while the abscissa axis indicates depth from the surface of a semiconductor layer stacked on a Si substrate.

As shown in FIG. 1, the SiGeHBT is constructed by sequentially stacking a SiGe buffer layer having an invariant Ge composition ratio, a B-doped, composition-graded layer having decreasing Ge composition ratio as it is closer to the surface and a Ge-free Si cap layer on a Si substrate provided with a pattern.

Such a structure having varying Ge composition ratio in the depthwise direction can be fabricated by varying the flow rates of respective source gases to be supplied to a crystal growth apparatus during crystal growth in the UHV-CVD process. Where disilane and germane are used as source gases, for example, supply of a source gas comprising disilane only to the crystal growth apparatus causes a Si layer to be epitaxially grown, while supply of germane in addition to the supply of disilane causes a SiGe layer to be epitaxially grown. Here, increasing the ratio of supply of germane to supply of disilane enables the Ge composition ratio of the resulting layer to increase. Accordingly, it is sufficient to increase the ratio of germane supply in order to grow a layer having a higher Ge composition ratio or to decrease the ratio of germane supply in order to grow a layer having a lower Ge composition ratio.

In this way the SiGeHBT is fabricated. The rate of growth of an epitaxial layer being grown under a reaction control condition by the UHV-CVD process varies depending on the substrate temperature and the Ge composition ratio. Therefore, precise measurement of the substrate temperature is desirable. However, the pattern formed on the Si substrate makes such precise measurement difficult. For this reason, the present invention is configured to form a first structure using a substrate for temperature estimation which is not provided with any pattern and then estimate the substrate temperature of a substrate provided with a pattern by utilizing the first structure.

The method of estimating substrate temperature according to the present invention can be roughly divided into two stages. The first stage is to form the first structure to be described later using the substrate for temperature estimation and then find the relationship between the substrate temperature of the substrate for temperature estimation included in the first structure and the rate of growth of a layer growing on the substrate for temperature estimation. The second stage is to form a second structure using a substrate provided with a pattern for use in an actual fabrication process (hereinafter referred to as "substrate for device fabrication"), measure the rate of growth of a layer growing on the substrate for device fabrication included in the second structure, and then estimate the substrate temperature of the substrate for device fabrication based on the rate of growth thus measured and the relationship between the substrate temperature of the substrate for temperature estimation and the rate of growth of the layer growing on the substrate for temperature estimation. Description will be given of the respective two stages.

First Stage

As described above, in the first stage of the method of estimating substrate temperature according to the present invention, the relationship between the substrate temperature of the substrate for temperature estimation and the rate of growth of a growing layer is found. Here, the relationship is found based on the following principle.

The rate of growth of a SiGe layer growing under a reaction control condition is determined by the two factors:

substrate temperature and Ge composition ratio. If the substrate temperature is constant, the rate of growth becomes higher with higher Ge composition ratio until the Ge composition ratio reaches about 30%. If the Ge composition ratio is fixed to a certain value, the rate of growth is temperature-dependent like a typical thermal excitation type reaction. That is, the following equation (1) is established.

$$g(x, T) = C(x)e^{\frac{-E(x)}{kT}} \quad (1)$$

wherein g represents a rate of growth, T represents a substrate temperature (in unit of absolute temperature), k represents a Boltzmann constant, E represents an activation energy and C represents a constant.

In the above-noted equation, x represents the Ge composition ratio of a SiGe layer and a function that does not contain T is meant to have no temperature dependence.

When the equation (1) is solved for T, the following equation (2) is established.

$$T = -\frac{E(x)}{k} \frac{1}{\ln\left(\frac{g(x, T)}{C(x)}\right)} \quad (2)$$

Accordingly, if C(x) and E(x) are found, the substrate temperature is determined from the rate of growth. It should be noted that it is not necessary to find C(x) and E(x) for all values of x but is sufficient to find C(x) and E(x) for at least one value of x.

To find C(x) and E(x), the first structure is formed using the substrate for temperature estimation in the manner described below and the substrate temperature of the substrate for temperature estimation and the rate of growth of the growing layer are measured.

Since C(x) and E(x) are values irrelevant to a substrate, a substrate which is not provided with any pattern can be used in finding these values. As already described, the substrate temperature of a substrate which is not provided with any pattern can be measured precisely with a pyrometer. For this reason, in this embodiment, such a substrate which is not provided with any pattern is used as the substrate for temperature estimation and the substrate temperature of the substrate for temperature estimation is measured with the pyrometer.

In the present invention, the Ge composition ratio x is preferably 0, i.e., x=0. This means that a layer growing on the substrate for temperature estimation is preferably made only of Si, for the following two major reasons.

Figure 2:
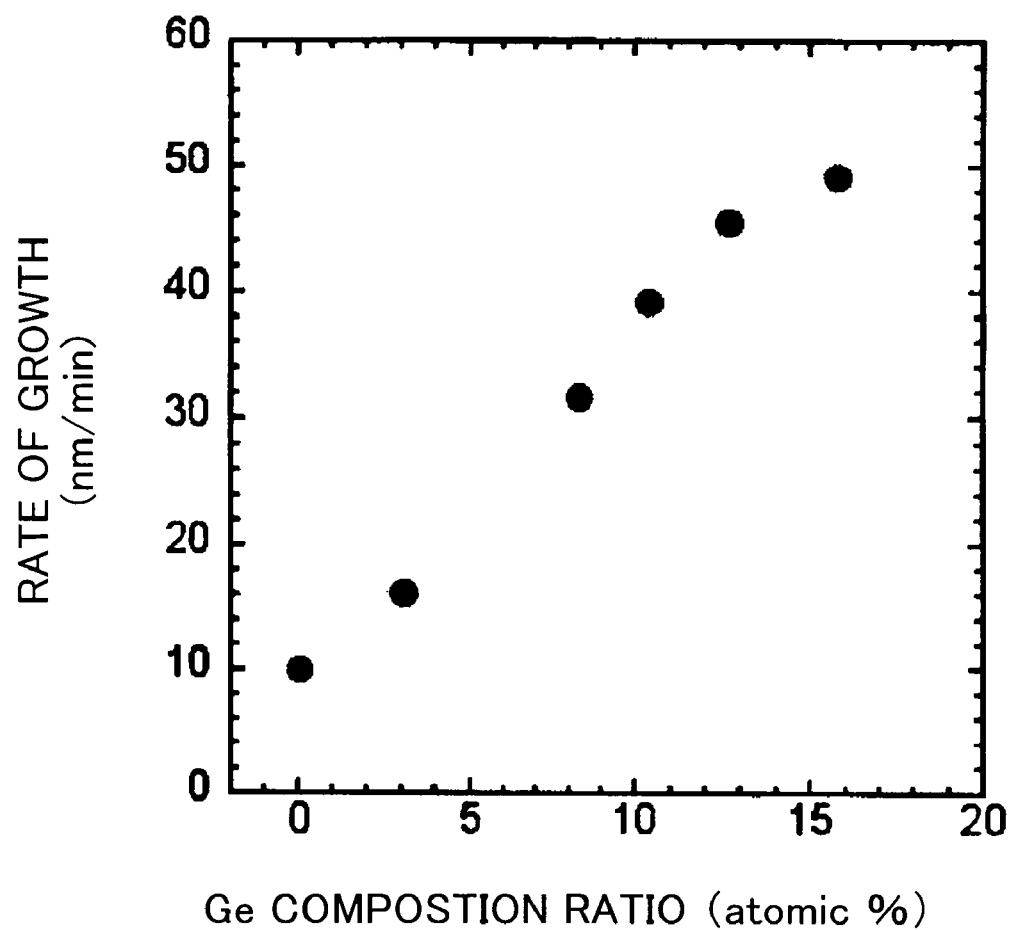
FIG. 2 is a diagram showing the relationship between rate of growth and Ge composition ratio of a growing layer.

Firstly, since the rate of growth of the growing layer varies depending not only on the substrate temperature but also on the Ge composition ratio, analysis on variations in the rate of growth need be conducted to classify the variations into two categories, a variation caused due to change in the substrate temperature, and a variation caused due to change in the Ge composition ratio. FIG. 2 is a diagram showing the relationship between rate of growth and Ge composition ratio of a growing layer at a growth temperature of 600° C. As apparent from FIG. 2, the rate of growth of a SiGe layer depends on the Ge composition ratio thereof; for example, the rate of growth of a SiGe layer having a Ge composition ratio of 0.15, i.e., x=0.15, is about five times as high as that of a SiGe layer having a Ge composition ratio of 0, i.e., x=0.

Though analysis on variations in the rate of growth classified into the aforementioned categories is possible in principle, such analysis requires that the film thickness and Ge composition ratio of a layer be measured precisely at the same time, which results in a drawback that an error tends to occur in determining the substrate temperature. In contrast, Si, which does not have a variable, i.e., a Ge composition ratio, has the advantage that such an error does not occur.

Secondly, as apparent from the equations (1) and (2), a variation in the rate of growth g becomes larger with increasing activation energy E when the substrate temperature T varies. Accordingly, the precision with which the substrate temperature T is determined from the rate of growth g becomes higher with increasing activation energy E. With too low activation energy E, the rate of growth g becomes too high when the substrate temperature T is high. For this reason, supply of the source gases cannot catch up with increasing rate of growth g, which causes the rate of growth g to be controlled by the rate of supply of source gases. In such a case, determination of the substrate temperature T from the rate of growth g becomes impossible. In this respect, also, Si is very convenient for use because Si has a larger activation energy E than SiGe mixed crystal.

The rate of growth of a growing layer can be obtained by dividing the film thickness of the growing layer by the time required for the growth of the layer. Where the substrate and the growing layer are made of different materials and hence have different optical properties, the film thickness of the growing layer can be measured easily by known methods such as an FTIR (Fourier Transform Infrared Spectrometer), reflectivity measurement, and an ellipsometer to be described later. However, where the substrate and the growing layer are made of the same material and hence have the same optical properties, such known methods are incapable of measuring the film thickness of the growing layer.

Accordingly, in the present invention, a layer having optical properties different from those of the growing layer and the substrate is formed between them when the growing layer subject to measurement of rate of growth and the substrate are made of the same material. Specifically, the first structure is formed using the substrate for temperature estimation which is not provided with any pattern in the following manner.

First, the substrate for temperature estimation made of Si is subjected to a known cleaning treatment such as RCA for removal of impurities from its surface. The substrate is treated with a hydrofluoric acid based chemical liquid to remove oxide film from the substrate surface at the final stage of the cleaning treatment. The substrate thus turned into a so-called hydrogen terminated surface condition is introduced into a crystal growth apparatus. Usable crystal growth apparatus for silicon-based mixed crystals include apparatus utilizing MBE (Molecular Beam Epitaxy) process, apparatus utilizing LP-CVD (Low Pressure Chemical Vapor Deposition) process and apparatus utilizing UHV-CVD process. While the present invention can be carried out using a crystal growth apparatus of any type, in this embodiment, a crystal growth apparatus utilizing UHV-CVD process is used as an illustrative example.

The substrate for temperature estimation thus introduced into the crystal growth apparatus is heated at a temperature ranging from 700° C. to 750° C. for five minutes in an ultra high vacuum atmosphere to remove residual oxide film remaining on the substrate surface, thereby exposing a clean crystal surface. Thereafter, the substrate temperature is lowered to a temperature for crystal growth. The temperature for crystal growth is suitably about 500° C. to about 650° C. In this embodiment, 600° C. is selected. When the substrate temperature becomes stabilized at the temperature for crystal growth, source gases are introduced into the crystal growth apparatus to initiate a chemical reaction between the source gases and the material of the substrate at the substrate surface, thus allowing epitaxial growth to proceed.

The layer epitaxially grown on the substrate for temperature estimation is made of a material that is optically different from the material of the substrate for temperature estimation. This is because the film thickness of the growing layer subject to measurement is measured by an optical technique in measuring the rate of growth of the growing layer, as described later. Here, some combinations of materials cause crystalline defects to occur during crystal growth and hence make it difficult to allow a crystal subject to measurement for its rate of growth to grow epitaxially on such crystalline defects in a good condition. For this reason, the material which is optically different from that of the substrate for temperature estimation, needs to be selected from materials which can be epitaxially grown into defect-free and good-condition crystals on the crystal of the substrate while allowing the same material as the substrate to grow thereon without crystalline defects.

Figure 3:
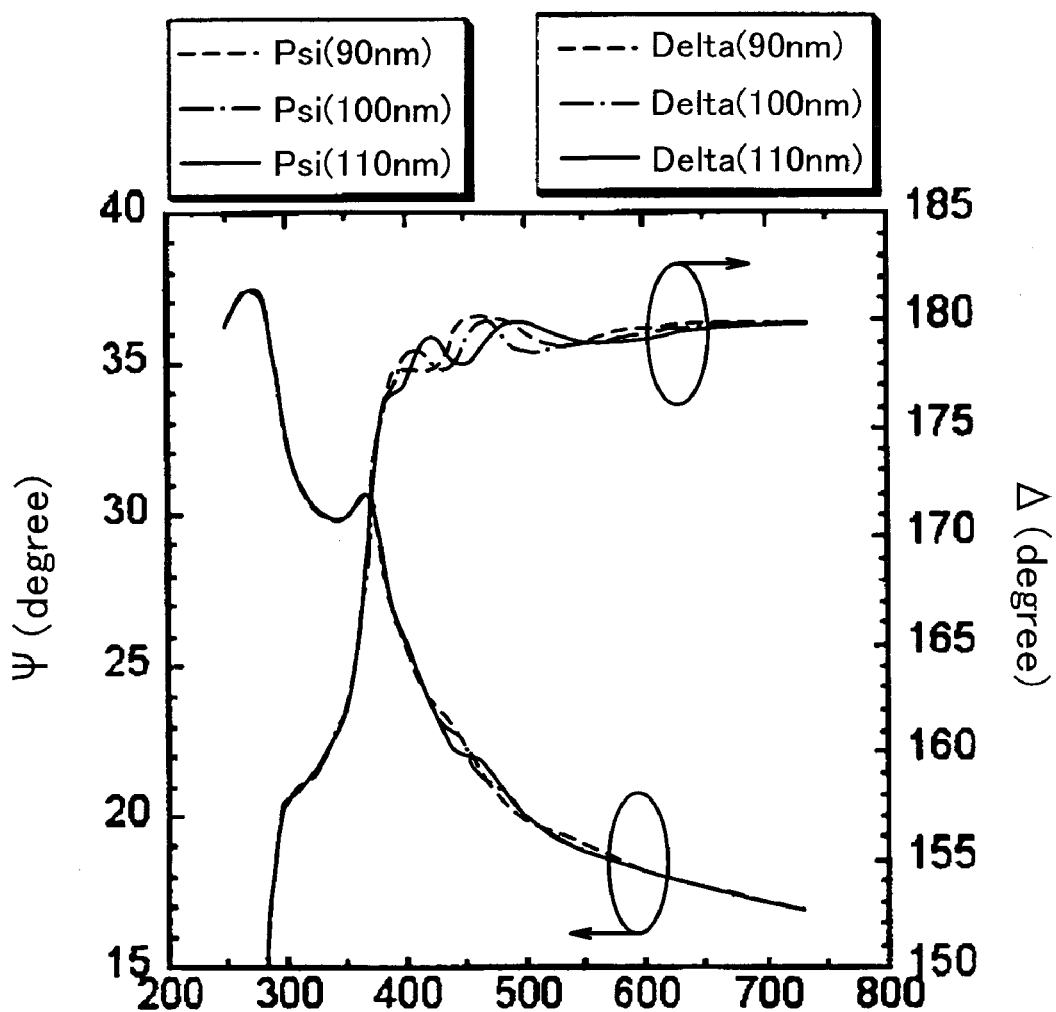
FIG. 3 is a diagram showing $\Psi\Delta$ theoretical spectra obtained from Si layers having respective thicknesses of 90 nm, 100 nm and 110 nm each formed on a 20 nm-thick SiGe layer having a Ge composition ratio of 2% with use of a spectroscopic ellipsometer.

If the substrate is made of Si, SiGe mixed crystals can satisfy the aforementioned requirements sufficiently. However, a SiGe mixed crystal having too low a Ge composition ratio has an optical constant that is not very different from that of Si, so that the precision of measurement of the film thickness of a layer to be measured for its rate of growth is lowered, which is inconvenient in carrying out the present invention. As apparent from FIG. 3 showing theoretical spectra obtained using a layer having a Ge composition ratio of 2%, the interference effect resulting from difference in film thickness is lowered as compared with theoretical spectra obtained using a layer having a Ge composition ratio of 15%. For this reason, the Ge composition ratio of such a layer is preferably at least 5%. On the other hand, a SiGe mixed crystal having too high a Ge composition ratio has a lattice constant that is largely different from that of Si of the substrate, which may result in crystalline defects such as dislocation due to lattice strain or in increased surface roughness, thus necessitating careful attention to be paid thereto. For this reason, the upper limit of the Ge composition ratio is preferably about 15%. To avoid the occurrence of crystalline defects, the film thickness of a SiGe layer having any Ge composition ratio is not more than a critical film thickness of the layer.

The crystal growth apparatus is supplied with disilane and germane to grow a SiGe layer epitaxially. In growing a SiGe layer having a Ge composition ratio of 15%, 28 sccm of germane relative to 22 sccm of disilane is supplied. The film thickness of this SiGe layer needs to be not more than a critical film thickness of the layer, which is about 100 nm when the Ge composition ratio of the SiGe layer is 15%. If this layer is too thin, the precision of measurement is lowered. For this reason, the SiGe layer needs to have a thickness of at least about 10 nm. In this embodiment, the SiGe layer is grown to a thickness of 20 nm. Since the rate of growth of a SiGe layer having a Ge composition ratio of 15% is about 50 nm/min, the gases are introduced for about 24 seconds. The film thickness of this layer is not necessarily controlled precisely and, hence, it is sufficient for the SiGe layer to grow to about 20 nm.

Subsequently, a Si layer is epitaxially grown on the SiGe layer under a reaction control condition. This can be achieved by stopping the supply of the source gas of germane with the supply of the source gas of disilane continued. Where Si is grown on the SiGe layer which has been grown to a thickness not more than the critical film thickness thereof on the Si substrate, the rate of growth of Si is as same as in the case where Si is grown directly on the Si substrate. If the film thickness of the Si layer is too thin, the precision of subsequent measurement of film thickness is lowered. For this reason, the Si layer needs to have a thickness of at least about 10 nm, or preferably about 100 nm if possible. In this case, setting the growth time to a simple value, for example one minute or 100 seconds, is convenient in later calculation of the rate of growth. Since the rate of growth of Si is about 2 nm/min at a substrate temperature of about 600° C., Si is grown for 50 minutes in this embodiment.

After the Si layer has been thus epitaxially grown under the reaction control condition, the supply of the source gas is stopped and the substrate for temperature estimation is cooled. Then, the substrate is taken out of the apparatus. Thus, the first structure is completed.

Figure 4:
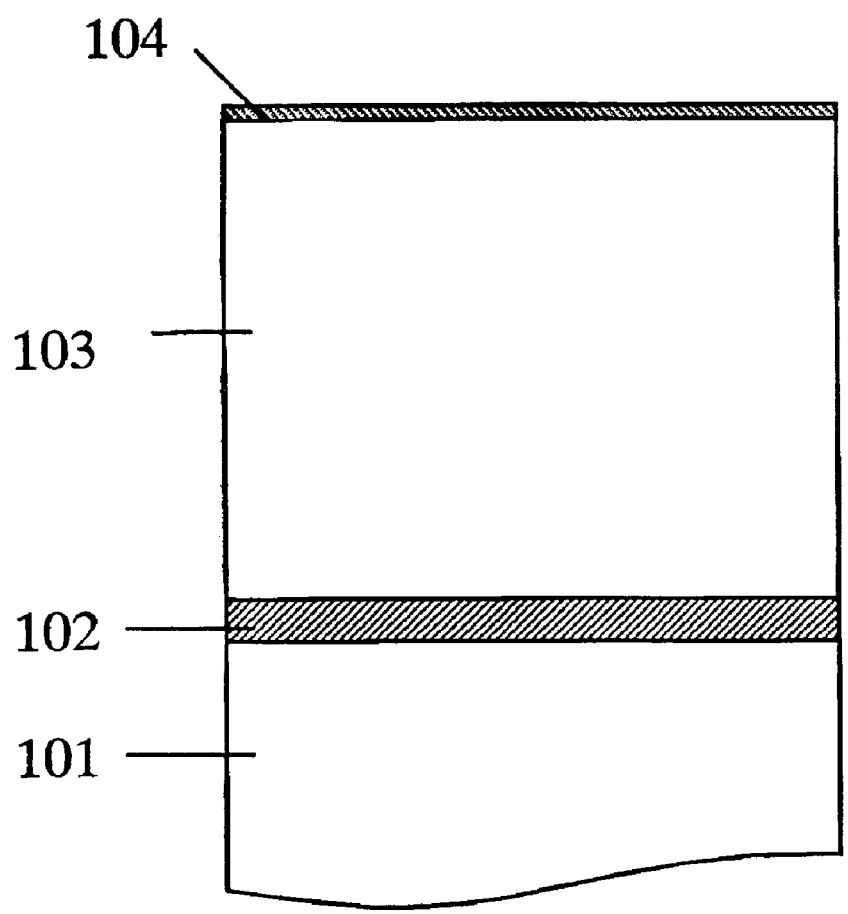
FIG. 4 is a conceptual illustration schematically showing the construction of a first structure used in the method of estimating substrate temperature according to the present invention.

FIG. 4 is a conceptual view schematically showing the construction of a first structure formed in the manner described above. As shown in FIG. 4, SiGe layer 102 and Si layer 103 are sequentially stacked on substrate for temperature estimation 101. Reference numeral 104 in FIG. 4 denotes an oxide film or surface roughness layer to be described later.

Figure 5:
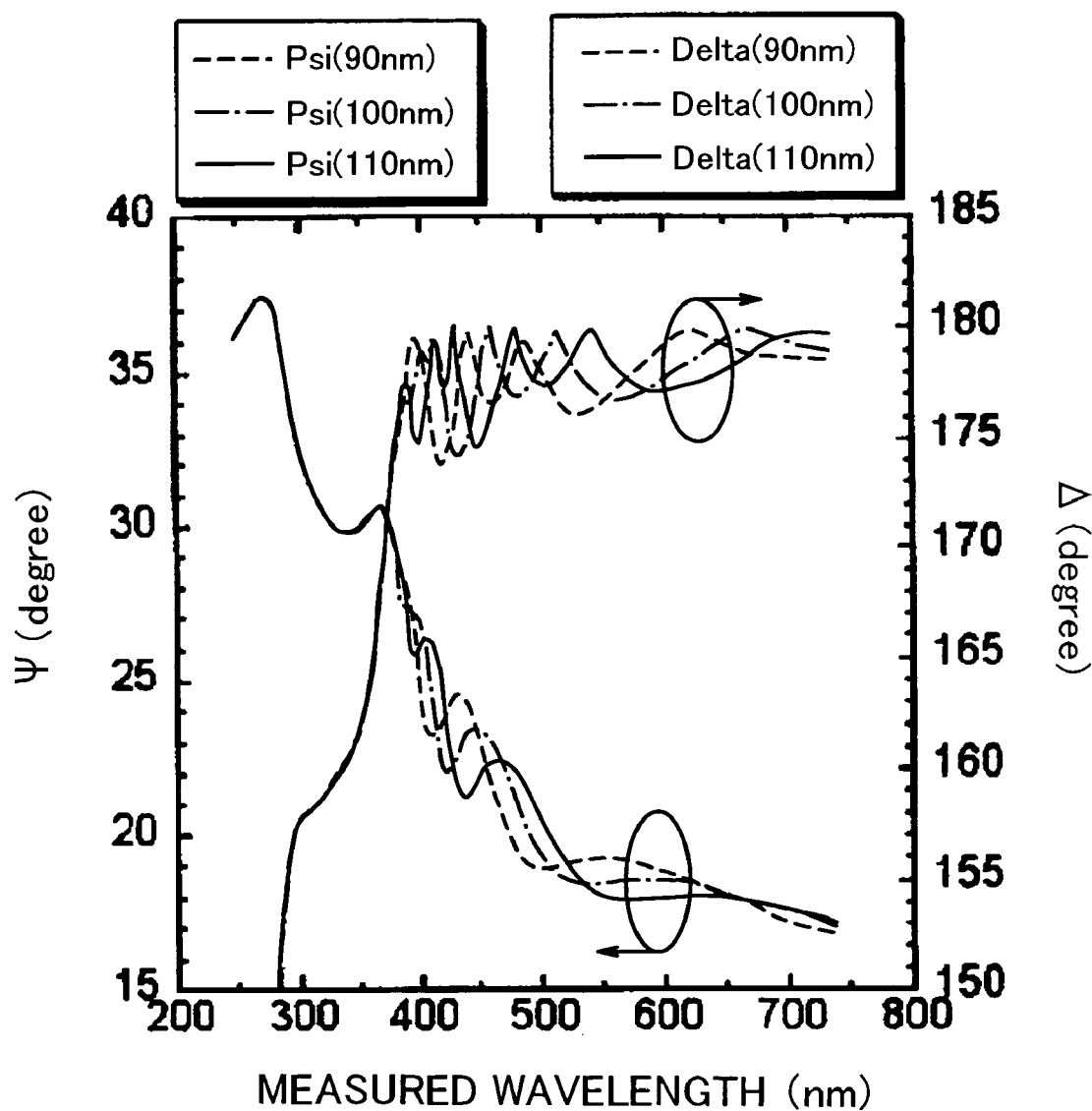
FIG. 5 is a diagram showing $\Psi\Delta$ theoretical spectra obtained from Si layers having respective thicknesses of 90 nm, 100 nm and 110 nm each formed on the 20 nm-thick SiGe layer having the Ge composition ratio of 15% with use of the spectroscopic ellipsometer.

Measurement of the film thickness of the Si layer 103 thus epitaxially grown is conducted using a spectroscopic ellipsometer to determine the rate of growth of the Si layer 103. The "ellipsometer" is an instrument capable of analyzing the state of a subject to be measured by irradiating the subject with linearly polarized light and measuring physical values Ψ and Δ related to the polarized condition of light reflected from the subject. Among such ellipsometers, one adapted for measurement with plural wavelengths is called "spectroscopic ellipsometer" and is capable of evaluating and analyzing a complicated structure. In this embodiment, such a spectroscopic ellipsometer is used because analysis on a multi-layered structure is needed. Wavelengths of light required in measurement of the film thickness of the Si layer 103 are such that: the respective optical constants of Si and SiGe are sufficiently different from each other; light is not absorbed very much in the Si layer 103; and light reflected by the interface between the Si layer 103 and the SiGe layer 102 is sufficiently measurable. Si and SiGe have different optical constants over a wavelength range from ultraviolet to infrared, but both exhibit high light absorption in ultraviolet range. For this reason, it is preferable to select a wavelength range including a visible light range in carrying out the present invention. Light having a wavelength within the visible light range does not attenuate very much even when it passes through a 100 nm-thick Si layer and hence can be used in film thickness measurement. FIG. 5 is a diagram showing ΨΔ theoretical spectra obtained from measurement of respective structures each comprising a Si substrate, a 20 nm-thick SiGe layer having a Ge composition ratio of 15% formed on the Si substrate, and a Si layer having a thickness of 90 nm, 100 nm or 110 nm formed on the SiGe layer at an angle of 65° with the spectroscopic ellipsometer. Though there is observed no difference between spectra in a wave range of not more than 350 nm due to differences in Si layer thickness because lights used are all attenuated at the respective Si layers, differences between Ψ,Δ spectra due to differences in Si layer thickness are observed in a wave range of more than 350 nm. This means that the Ψ,Δ spectra in that range contain information about the thicknesses of the Si layers. Thus, the thickness of a Si layer can be determined by analysis of such ΨΔ spectra.

Usually, however, it is very difficult to determine a film thickness directly from values of Ψ and Δ. For this reason, an operation is performed including: assuming a first structure (as to its stacked structure, thickness of each layer, composition of each layer and the like); and finding a structure having measured values of Ψ and Δ that are closest to theoretical values of Ψ and Δ derived from the first structure. Specifically, with the types and stacking order of layers and the like being fixed, the thickness or composition ratio of each layer is used as a parameter to find a value of parameter with which the difference between the measured values of Ψ and Δ and the theoretical values of Ψ and Δ (usually the square sum of the differences between these two) becomes smallest.

Though the first structure formed in this embodiment has a structure: Si layer 103/SiGe layer 102/Si substrate 101, an oxide film or surface roughness layer 104 is formed on the surface, because in analysis by the spectroscopic ellipsometer, the influence of the oxide layer or surface roughness layer 104 is taken into consideration. Parameters for use are the film thickness of the Si layer 103, film thickness of the SiGe layer 102, Ge composition ratio of the SiGe layer 101, film thickness of the surface roughness layer 104, and angle of incidence of light. Initial values are given to these parameters, and values of the respective parameters such as to minimize a value to be estimated such as the square sum of the differences between measured values of Ψ and Δ and theoretical values of Ψ and Δ, are determined by utilizing an algorithm such as steepest descent method. By considering the values of the respective parameters with which the value to be estimated becomes the minimum to be measured values, the film thickness of the Si layer 103 can be determined.

Thus, even when a layer of the same material as a substrate is epitaxially grown, growing another layer made of a material optically different from the material of the layer and the substrate between them gives rise to an interference effect and hence makes it possible to measure the film thickness of the layer of the same material as the substrate. The rate of growth of this layer can be determined by dividing the film thickness thus measured by the time required for the growth of the layer.

Since measurement by the spectroscopic ellipsometer is nondestructive, there is no need to cleave a sample, unlike a method of measurement employing an electron microscope. Further, since the spectroscopic ellipsometer is capable of rapid measurement, it can be used in an application requiring multiple measurements such as measurement of a growth rate distribution in a plane. In addition, measurement by the spectroscopic ellipsometer can be achieved if a sufficiently large region for measurement is secured on a substrate and, hence, the spectroscopic ellipsometer can be used in analyzing both of a substrate provided with a pattern and a substrate which is not provided with any pattern. While the area of the region depends on the structure of a spectroscopic ellipsometer to be used, a region having an area of several hundred micrometers square is usually sufficient for the spectroscopic ellipsometer to achieve measurement. Thus, if such a region can be secured on a substrate to be actually used in measurement of the rate of growth of a layer thereon, it is possible to measure the rate of growth of a layer on a substrate provided with a pattern. A plurality of such regions may be provided in the plane of a substrate. If, for example, one such region is provided for one chip that will be a product, it is possible to determine a rate of growth at a specific chip, hence to predict an yield as well as to allow a crystal growth apparatus to be modified to realize uniform rate of growth. Of course, if a distribution of rate of growth in a substrate plane is gentle, the number of regions for measurement may be smaller than the number of chips.

Figure 6:
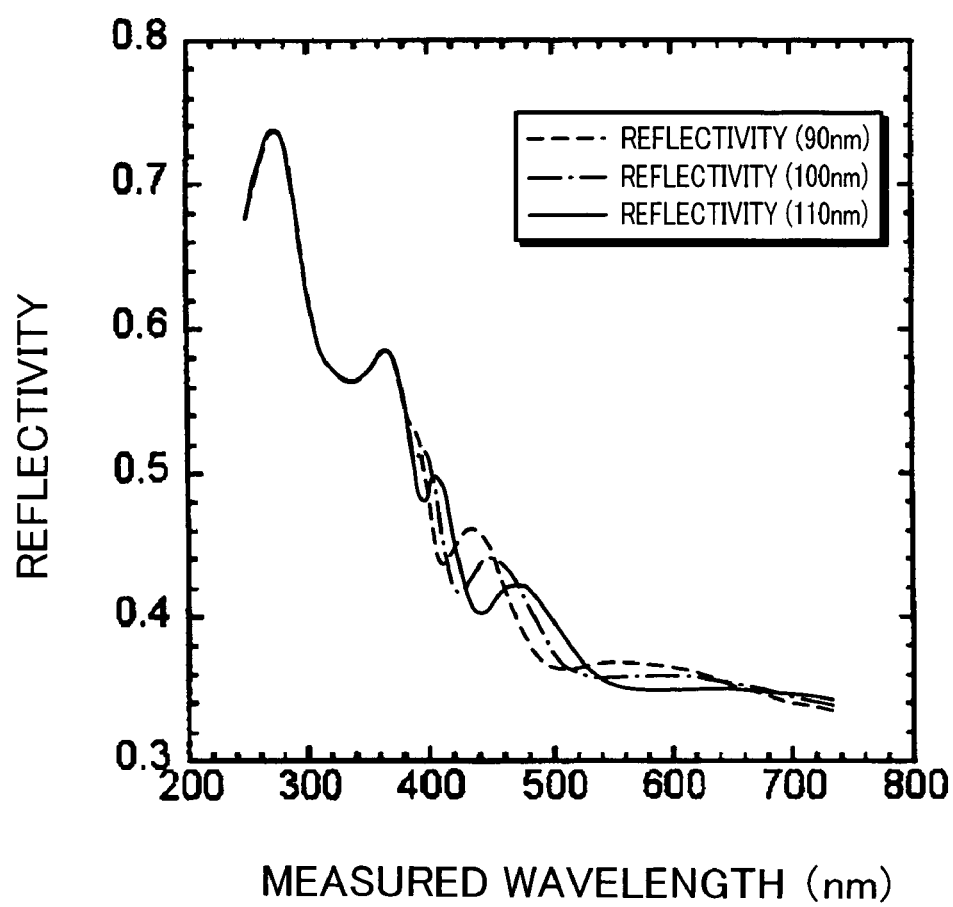
FIG. 6 is a diagram showing reflectivity theoretical spectra obtained from Si layers having respective thicknesses of 90 nm, 100 nm and 110 nm each formed on the 20 nm-thick SiGe layer having a Ge composition ratio of 15%.

Instead of the spectroscopic ellipsometer, a spectral reflectometer may be used to measure the film thickness of the layer of the same material as the substrate. In this case, the film thickness of such a layer can be measured following substantially the same procedure as in the case of the spectroscopic ellipsometer except that resistivity is used instead of values of Ψ and Δ. FIG. 6 shows spectra obtained from measurement of the same structure as in FIG. 5 with such a spectral reflectometer. It is to be noted that the angle of measurement assumes 10° in this case. The spectral reflectometer is advantageous over the spectroscopic ellipsometer in that the reflectometer is generally less expensive than the ellipsometer and that reflectometer requires a smaller region for measurement. However, in terms of the precision of film thickness measurement, the spectral reflectometer is sometimes inferior to the spectroscopic ellipsometer.

In this embodiment, SiGe is selected as the material for the layer between the Si layer and the Si substrate. This is because SiGe is one of optimal materials for use in carrying out the present invention to measure the rate of growth of the Si layer. It is, however, needless to say that the present invention can be carried out without limitation to this material. In the present invention, it is possible to use any material which is different in optical constant from the substrate, produces an optical interference effect, and can epitaxially grow without crystalline defects. In measurement of the rate of growth of the Si layer, a SiGeC layer may be selected as the layer between the Si layer and the Si substrate instead of the SiGe layer. If a source containing C such as methylsilane is supplied at the same time with supply of other sources in growing SiGe by UHV-CVD process, C is incorporated in the resulting crystal to allow SiGeC to grow epitaxially. Since C has a lower lattice constant than Si or Ge, it functions to lower the lattice constant of the layer which would otherwise rise by an increased Ge composition ratio, thereby reducing lattice strain. Accordingly, such a SiGeC layer can loosen the limitation on the critical film thickness to a larger extent than the SiGe layer and allows the Ge composition ratio thereof and the film thickness thereof to increase for a stronger interference effect. Thus, if the SiGeC layer has a film thickness equal to that of the SiGe layer, difference in optical constant between SiGeC and Si can made larger than that between SiGe and Si by making the Ge composition ratio thereof higher than that of the SiGe layer, hence can enhance the precision of measurement of the film thickness of the Si layer. If the SiGeC layer has a Ge composition ratio equal to that of the SiGe layer, the SiGeC layer can be made thicker than the SiGe layer. This causes a more conspicuous interference effect, which contributes to a higher precision of measurement of the Si layer.

Figure 7:
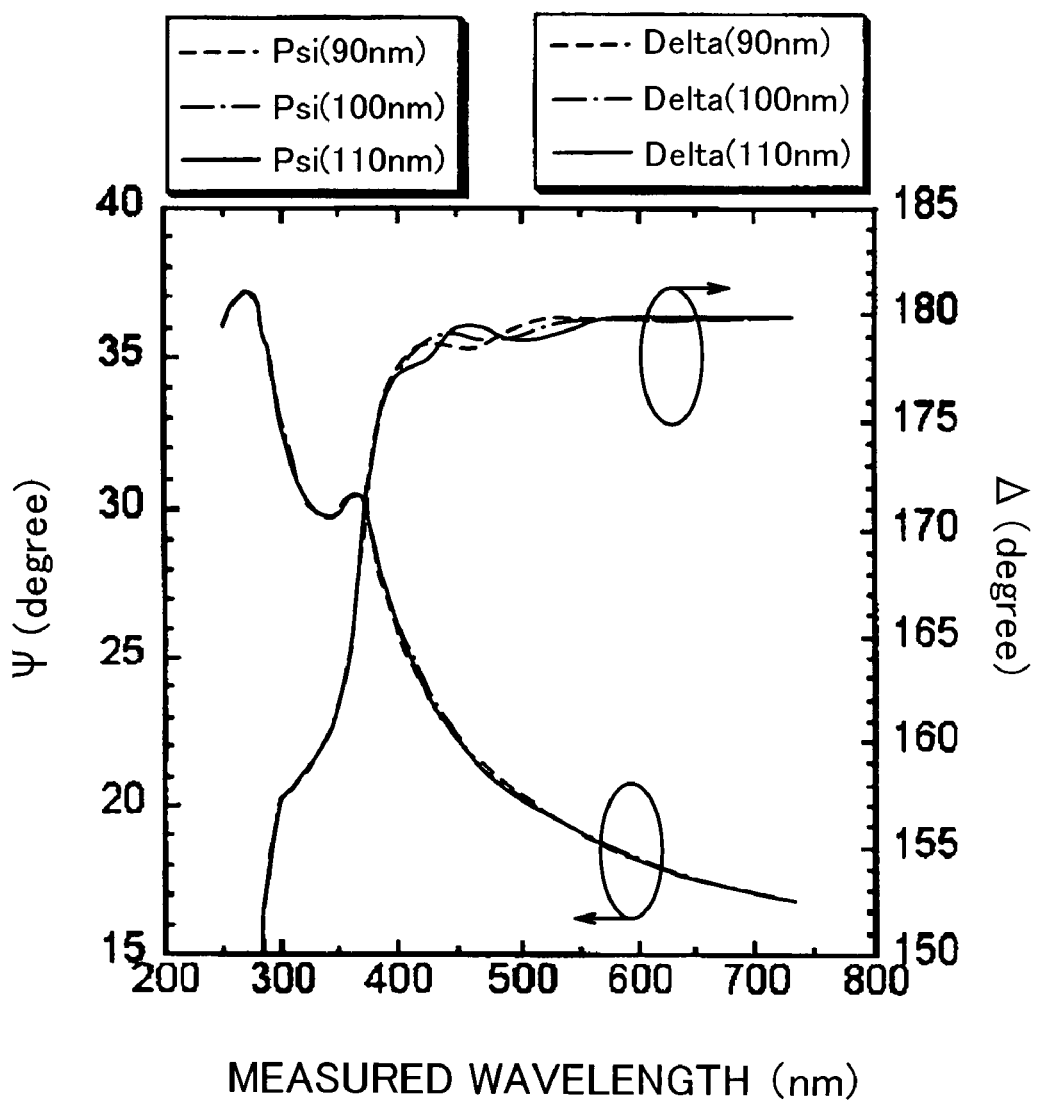
FIG. 7 is a diagram showing $\Psi\Delta$ theoretical spectra obtained from SiGe layers having a Ge composition ratio of 2% and respective thicknesses of 90 nm, 100 nm and 110 nm each formed directly on a Si substrate with use of the spectroscopic ellipsometer.
Figure 8:
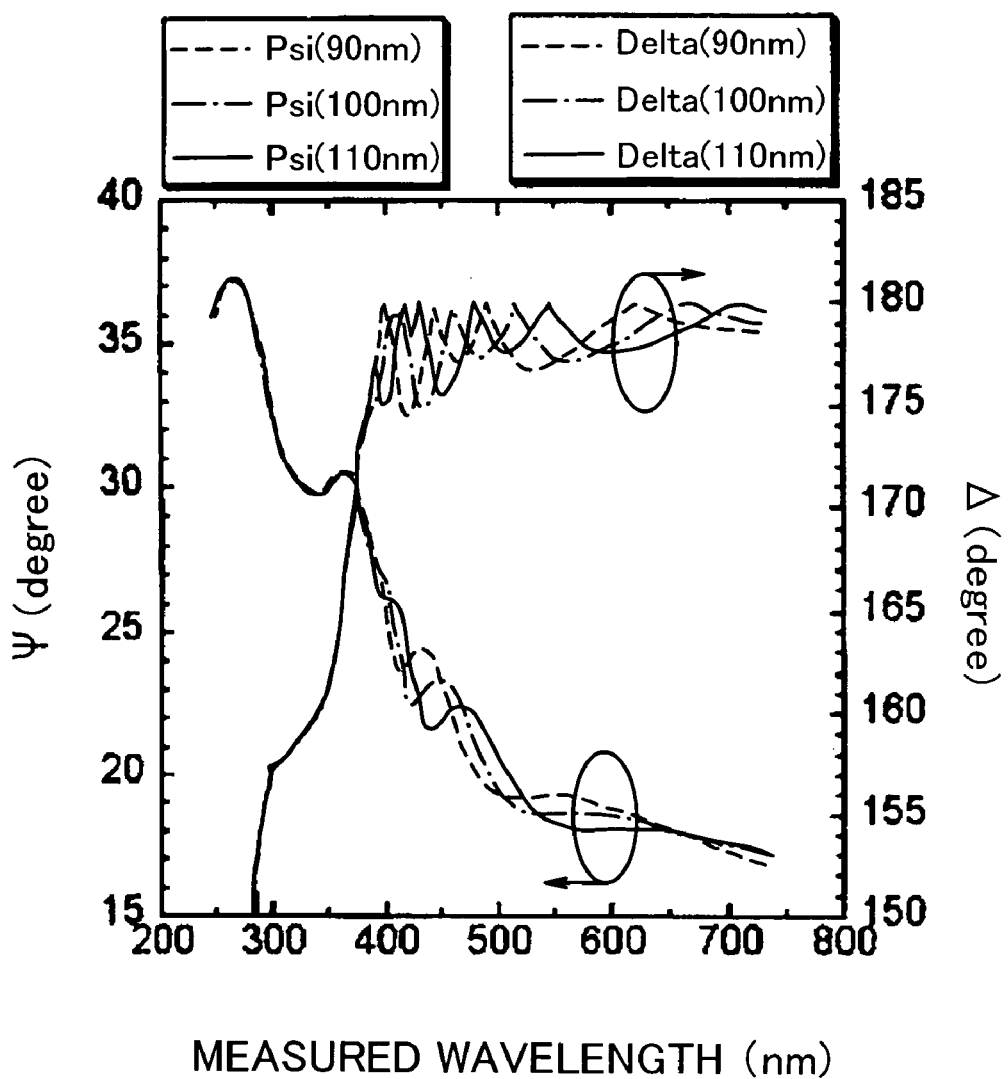
FIG. 8 is a diagram showing $\Psi\Delta$ theoretical spectra obtained from SiGe layers having a Ge composition ratio of 2% and respective thicknesses of 90 nm, 100 nm and 110 nm each formed on a 20 nm-thick SiGe layer having a Ge composition ratio of 15% with use of the spectroscopic ellipsometer.

It is to be noted that, of course, a rate of crystal growth can be measured without depending on the concentration of an impurity such as B, As or P The foregoing method of measuring the rate of crystal growth is not limited to the growth of the same material as the substrate and can measure the rate of growth of a material having physical properties near those of the substrate. For example, among SiGe mixed crystals, those having low Ge composition ratios are very similar to Si in various physical properties. For this reason, it is difficult for the conventional method of measurement to measure the film thickness of a SiGe single layer having a Ge composition ratio of 2% grown on a Si substrate precisely. For instance, FIG. 7 shows theoretical spectra obtained from samples each including a SiGe layer having a Ge composition ratio of 2% formed directly on a Si substrate with the spectroscopic ellipsometer. Though the SiGe layers have thicknesses of 90, 100 and 110 nm, there is little difference between the corresponding theoretical spectra. However, if a SiGe layer having a Ge composition ratio of 15% is formed prior to the formation of a SiGe layer having a Ge composition ratio of 2% as in this embodiment, the difference in Ge composition ratio between the layers results in a different in optical constant between them (see FIG. 8). Thus, it is possible to measure the film thickness of the layer having a Ge composition ratio of 2% with a spectroscopic ellipsometer, hence, determine the rate of growth of the layer with high precision.

In this way, by forming the SiGe layer having a relatively high Ge composition ratio (hereinafter referred to as "first SiGe layer", indicated by reference numeral 102 in FIG. 4) prior to the formation of a SiGe layer having a relatively low Ge composition ratio (hereinafter referred to as "second SiGe layer", indicated by reference numeral 103 in FIG. 4), it becomes possible to measure the film thickness of the second SiGe layer with the spectroscopic ellipsometer or the like. Though it is difficult to measure the film thickness of the second SiGe layer with the spectroscopic ellipsometer or the like if the difference in Ge composition ratio between the first SiGe layer and the second SiGe layer is very small, a difference of 5% in Ge composition ratio between these layers allows measurement of the film thickness of the second SiGe layer to be achieved with sufficient precision. However, in the case where the Ge composition ratio of the second SiGe layer is higher than 5% for example, the difference in optical constant between the second SiGe layer and the Si substrate is large enough and, hence, the film thickness of the second SiGe layer can be measured with the spectroscopic ellipsometer or the like without the need to form the first SiGe layer between the second SiGe layer and the Si substrate. For this reason, the present invention is significant when it is applied to cases where the Ge composition ratio of the second SiGe layer is 5% or lower. The Ge composition ratio of the first SiGe layer is about 30% at maximum.

The present invention is applicable to $Si_{1-y}C_y$ having a relatively low C composition ratio, SiGeC having relatively low (not more than about 2% for example) Ge composition ratio and C composition ratio, and the like as well as to the SiGe layer described above since these materials are very similar to Si in various physical properties. It is difficult to measure the film thickness of a layer made of SiGeC having a relatively low C composition ratio with the spectroscopic ellipsometer or the like because the optical constant of such SiGeC is substantially equal to that of SiGe having a Ge composition ratio equal thereto. For this reason, where the second layer made of SiGeC having a relatively low C composition ratio is to be stacked on the first SiGe layer, the difference in Ge composition ratio between the first SiGe layer and the second layer is preferably set to 5% or larger.

As described above, it is possible to use the SiGe layer, the $Si_{1-y}C_y$ layer, the SiGeC layer or the like instead of the Si layer. In view of this, a layer stacked on the SiGe layer formed on the Si substrate will be referred to as a "Si-containing layer" instead of the "Si layer" in the following description.

The rate of epitaxial growth of a layer is basically not dependent on the type of a layer having been grown prior to the epitaxial growth of the layer or on the type of a layer to be grown subsequently of the layer on condition that the substrate temperature and the source gas supply conditions during the growth of the layer of interest are constant. Accordingly, the rate of growth of a certain material determined following the procedure of the present invention can be utilized in controlling the film thickness or the like of a layer comprising an epitaxial layer of the certain material during its growth. For example, once the rate of growth of the Si-containing layer has been determined according to the method of the present invention, the rate thus determined can be utilized in controlling the film thickness of a Si cap layer included in the epitaxial growth layer structure of any one of various Si-based heterostructure devices including SiGe hetero FETs as well as SiGeHBTs.

In this way, the rate of growth of the Si-containing layer 103 on the substrate for temperature estimation 101 can be measured. As described earlier, the substrate temperature of the substrate for temperature estimation 101 can be measured precisely with use of a pyrometer since the substrate 101 is not provided with any pattern. Based on the rate of growth of the Si-containing layer 103 and the substrate temperature of the substrate for temperature estimation 101 thus measured, $C(x)$ and $E(x)$ in the aforenoted equations (1) and (2) can be obtained. Since the substrate for temperature estimation 101 is a Si substrate, the value of x is 0.

Figure 9:
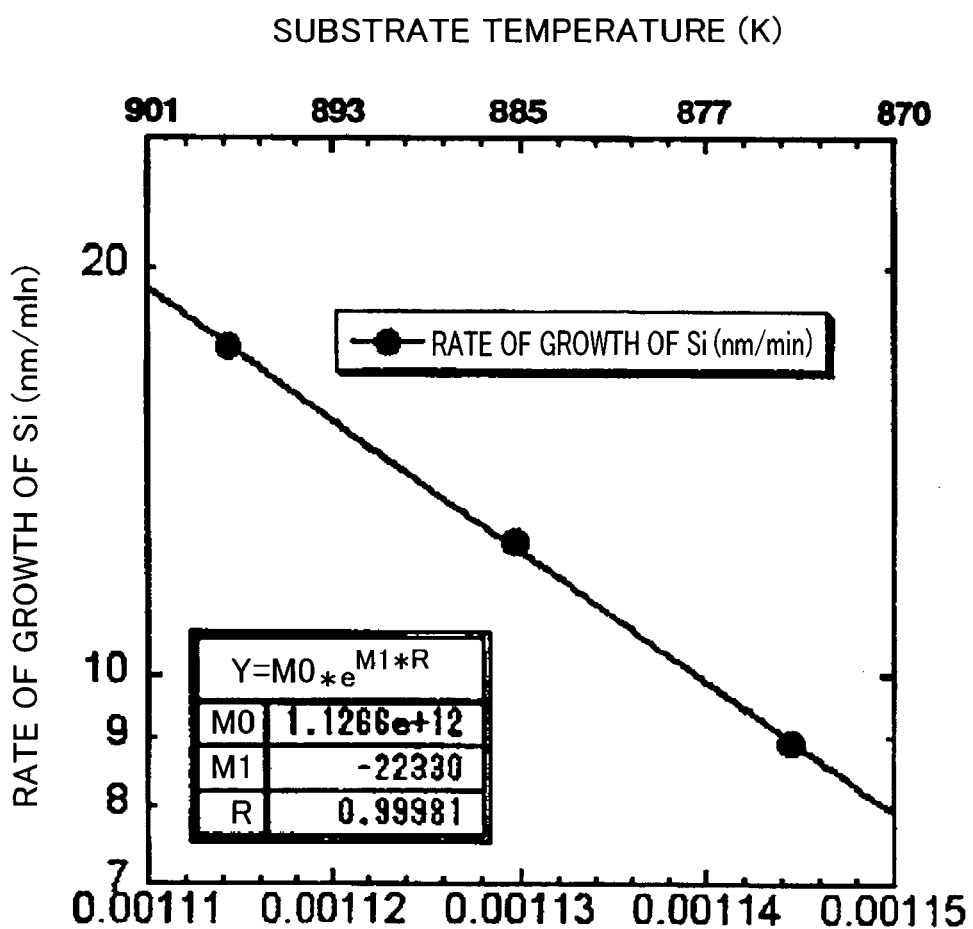
FIG. 9 is a diagram showing the relationship between substrate temperature and rate of growth of a Si layer found in the method of estimating substrate temperature according to the present invention.

When $C(x)$ and $E(x)$ are given, the substrate temperature can be determined from the rate of growth of a growing layer based on equation (2). FIG. 9 shows the relationship between substrate temperature and rate of growth of the Si-containing layer obtained based on $C(x)$ and $E(x)$ thus determined.

As described above, the first stage of the method of estimating substrate temperature of the present invention is to form the first structure using the substrate for temperature estimation 101 and then find the relationship between substrate temperature of the substrate for temperature estimation 101 and rate of growth of the Si-containing layer 103. Subsequently, description will be made of the second stage of the method of estimating substrate temperature of the present invention.

Second Stage

In the second stage, the rate of growth of a growing layer on a substrate for device fabrication for use in an actual fabrication process is measured, and the substrate temperature of the substrate for device fabrication is estimated based on the measured rate of growth and the relationship between substrate temperature of the substrate for temperature estimation 101 and rate of growth of the Si-containing layer 103, which have been measured in the first stage.

First, a second structure of the same construction as the first structure formed using the substrate for temperature estimation 101 in the first stage, i.e., Si-containing layer/ SiGe layer/Si substrate, is formed following the same procedure as in the first stage. Here, the Si substrate in the second structure is a substrate for device fabrication provided with a pattern unlike the substrate used in the first structure.

Measurement of the rate of growth of the Si-containing layer in the second structure will be described in more detail. Initially, the substrate for device fabrication is heated until a part of the substrate which can be precisely measured for its temperature reaches a predetermined temperature (hereinafter referred to as "reference temperature"). The "part which can be precisely measured for its temperature" is, for example, the reverse surface of the substrate or the inside of the susceptor. The temperature of such a part can be measured precisely by using a thermocouple or the like. In this embodiment the temperature inside the susceptor is measured with such a thermocouple and the substrate is heated until the temperature inside the susceptor reaches the reference temperature.

When the temperature inside the susceptor has reached the reference temperature, source gases are supplied while keeping the reference temperature to allow the Si-containing layer to grow epitaxially under a reaction control condition.

The film thickness of the Si-containing layer thus grown is measured using the spectroscopic ellipsometer or the spectral reflectometer as in the first stage. Subsequently, the rate of growth of the Si-containing layer is calculated by dividing the film thickness thus measured by the time required for growth. To allow the spectroscopic ellipsometer or spectral reflectometer to measure a film thickness, a pattern-free flat region having an area sufficient to accommodate a measurement spot is needed. Usually, it is sufficient for this region to have an area of about several hundred micrometers square, though the required area varies depending on measuring instruments. For this reason, the substrate for device fabrication is previously provided with such a region. A required number of such regions can be formed on the substrate for device fabrication. If such regions are formed in the portion of the substrate that can be utilized for device fabrication, the area of the substrate that can be utilized for device fabrication is reduced, so that the number of devices to be obtained from one substrate is reduced. It is therefore preferable to form regions for measurement within the portion that is not utilized in device fabrication such as a scribe lane.

Though the rate of growth of the Si-containing layer can be measured in the manner described above, it is difficult to measure the substrate temperature of the substrate for device fabrication at the time when the rate of growth of the Si-containing layer is measured. This is because the pattern formed on the substrate for device fabrication makes it difficult to measure the substrate temperature precisely with the pyrometer. For this reason, the measured rate of growth of the Si-containing layer in the second structure is compared with the rate of growth of the Si-containing layer 103 determined in the first stage, and the substrate temperature of the substrate for temperature estimation corresponding to the rate of growth of the layer 103 determined in the first stage that is equal to the rate of growth of the Si-containing layer in the second structure is estimated as the substrate temperature of the substrate for device fabrication.

As apparent from FIG. 9, when the rate of growth of the Si-containing layer 103 in the first structure is 9 nm/min for example, the substrate temperature of the substrate for temperature estimation is about 873K. Thus, when the measured rate of growth of the Si-containing layer in the second structure is 9 nm/min, the substrate temperature of the substrate for device fabrication is estimated to be about 873K.

While the first stage and the second stage are different from each other in that the substrate used is whether the substrate for temperature estimation which is a Si substrate which is not provided with any pattern or the substrate for device fabrication which is a Si substrate provided with a pattern, they have a common feature that a Si-containing layer is epitaxially grown on a Si substrate. Accordingly, if the rates of growth of the layers comprising Si are equal to each other, the substrate temperature of the substrate for temperature estimation and the substrate temperature of the substrate for device fabrication during the growth of respective layers comprising Si are considered to have the same value. Thus, the substrate temperature of the substrate for temperature estimation corresponding to the rate of growth of the Si-containing layer 103 determined in the first stage that is equal to the rate of growth of the Si-containing layer in the second structure can be estimated as the substrate temperature of the substrate for device fabrication.

It is needless to say that the Si-containing layer 103 in the first structure and the Si-containing layer in the second structure need to be made of the same material. That is, if the Si-containing layer 103 in the first structure is a Si layer, then the Si-containing layer in the second structure is also a Si layer. Likewise, if the Si-containing layer 103 in the first structure is a SiGe layer, $Si_{1-y}C_y$ layer, SiGeC layer or the like, then the Si-containing layer in the second structure is also a SiGe layer, $Si_{1-y}C_y$ layer, SiGeC layer or the like.

By repeating the procedure described above with the reference temperature varied, it is possible to find a correlation between estimated substrate temperatures of the substrate for device fabrication and reference temperatures. Specifically, it is possible to know what degree in centigrade the substrate temperature of the substrate for device fabrication has when the reference temperature has a certain degree in centigrade. Thus, it is possible to know to what degree in centigrade the substrate temperature of the substrate for device fabrication needs to be set in order for the rate of growth of the Si-containing layer to have a desired value and to what degree in centigrade the temperature inside the susceptor needs to be set in order for the substrate temperature of the substrate for device fabrication to have a desired value. Therefore, the rate of growth of the Si-containing layer can be set to a desired value by adjusting the temperature inside the susceptor.

Although the substrate temperature of the substrate for device fabrication is dependent on the pattern formed prior to the epitaxial growth process, it is not dependent on the layer grown in the epitaxial growth process. Accordingly, the set temperature inside the susceptor determined based on the rate of growth of the Si-containing layer can also be utilized in epitaxial growth of another layer.

It is sufficient for the set temperature inside the susceptor to be determined once for each type of substrate for device fabrication. By automatically adjusting the set temperature in such a manner that a desired value is read out from a data base in which values of the set temperatures are stored, it becomes possible to fabricate a desired structure easily.

Embodiment 2

In embodiment 1, the substrate temperature of the substrate for device fabrication and the rate of growth of the growing layer in the second structure are measured at one point. In embodiment 2, on the other hand, the substrate temperature of the substrate for device fabrication and the rate of growth of the growing layer in the second structure are measured at plural points. By so doing, it is possible to know the distribution of substrate temperature in the plane of the substrate for device fabrication.

First, the first stage of embodiment 1 is carried out. Subsequently, the second stage of embodiment 1 is carried out to form a second structure and the film thickness of a Si-containing layer is measured with a spectroscopic ellipsometer or spectral reflectometer. The spectroscopic ellipsometer or spectral reflectometer used in this embodiment has a movable stage on which the second structure is placed and hence is capable of measuring the film thickness of the Si-containing layer at any desired point in the plane of the second structure. Such a spectroscopic ellipsometer or spectral reflectometer thus constructed is generally used in semiconductor fabrication factories.

By the use of such an instrument, film thicknesses of the Si-containing layer at plural points in the plane of the second structure are measured while shifting the measurement point. Rates of growth of the Si-containing layer at the plural points are calculated from the corresponding film thicknesses of the Si-containing layer thus measured in the manner described earlier.

Subsequently, substrate temperatures of the substrate for device fabrication at plural points are estimated from the rates of growth of the Si-containing layer at the plural points thus calculated and the relationship between substrate temperature of the substrate for temperature estimation 101 and rate of growth of the Si-containing layer 103 in the first structure, which has been found in the first stage. By doing so, it is possible to know the distribution of substrate temperature in the plane of the substrate for device fabrication. By adjustments, such as to change the output ratio between plural heaters, based on the temperature distribution in the plane of the substrate thus obtained, it is possible to reduce variations in substrate temperature in the plane of the substrate for device fabrication. As a result, a higher yield can be realized.

In each of the foregoing embodiments 1 and 2, the Si-containing layer is epitaxially grown on the SiGe layer formed on the Si substrate and the substrate temperature of the substrate for device fabrication is estimated based on the rate of growth of the Si-containing layer. An alternative method of estimating substrate temperature is conceivable, which includes: growing a polysilicon layer on a $SiO_2$ film formed on a Si substrate; and estimating the substrate temperature based on the rate of growth of the polysilicon layer. Since polysilicon grows under a reaction control condition like Si, it seems that the substrate temperature can be effectively estimated even from the rate of growth of such a polysilicon layer. With such a polysilicon layer, however, the precision of substrate temperature estimation is lower than with a silicon layer. The following description is directed to this point.

Figure 10A:
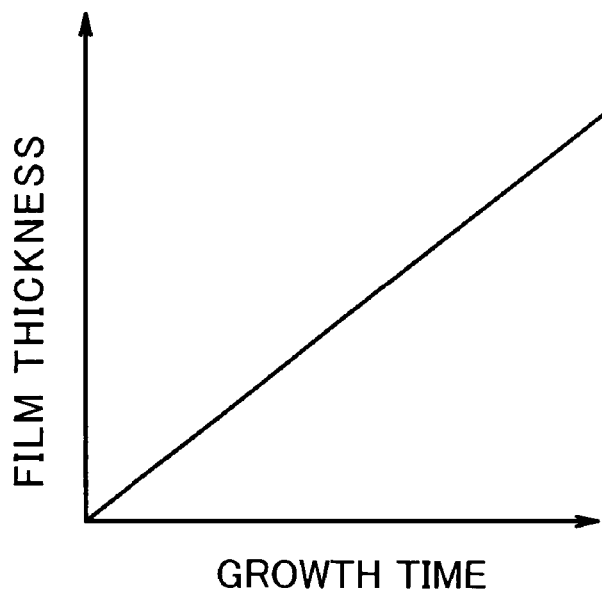
FIG. 10A is a diagram showing the relationship between film thickness of a growing layer of a single crystal such as Si and time of growth and FIG. 10B is a diagram showing the relationship between film thickness of the growing layer of a polycrystal such as polysilicon and time of growth.
Figure 10B:
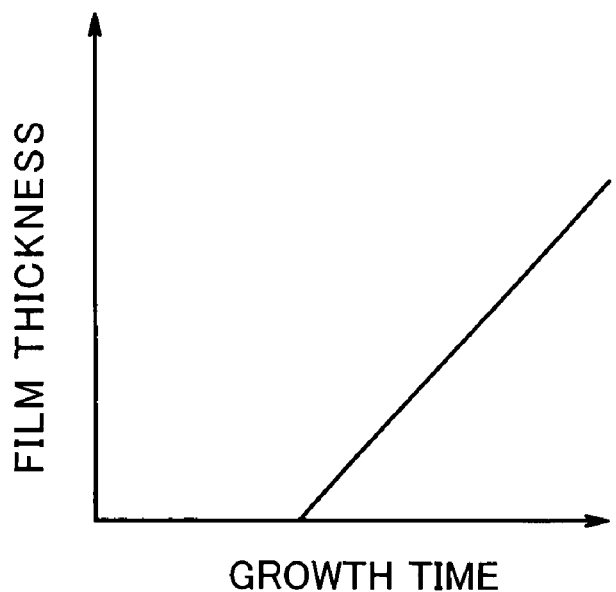

FIG. 10A is a diagram showing the relationship between film thickness of a growing layer of a single crystal such as Si and growth time and FIG. 10B is a diagram showing the relationship between film thickness of a growing layer of a polycrystal such as polysilicon and growth time.

As apparent from FIG. 10A, in the case of the growing layer of a single crystal, film thickness of the growing layer and growth time are directly proportional to each other. Accordingly, the rate of growth of a single-crystal growing layer can be determined easily. On the other hand, as apparent from FIG. 10B, film thickness of the polycrystal growing layer and growth time are not directly proportional to each other because lapse of a certain time period is required before the starting of growth. For this reason, the rate of growth of the polycrystal growing layer can not easily be determined and an error tends to occur. As a result, the precision of substrate temperature estimation based on the rate of growth of such a polycrystal growing layer is lower than that based on the rate of growth of a single-crystal growing layer. It is, therefore, preferable to conduct substrate temperature estimation based on the rate of growth of a Si layer, which is made of single crystal, as in the foregoing embodiments 1 and 2.

While only certain presently preferred embodiments of the present invention, which should be construed as not limitative but illustrative of the present invention, have been described in detail for the purpose of teaching the best mode for carrying out the invention to those skilled in the art, as will be apparent for those skilled in the art, various modifications and other variations can be made in the embodiments without departing from the spirit and scope of the present invention as defined by the following claims.

What is claimed is:

1. A method of estimating substrate temperature, comprising:

epitaxially growing a first semiconductor layer on a substrate for temperature estimation, the first semiconductor layer being made of a single crystal material having an optical constant that is different from an optical constant of the substrate for temperature estimation, and then epitaxially growing a second semiconductor layer on the first semiconductor layer under a reaction control condition, the second semiconductor layer being made of a single crystal material having an optical constant that is substantially equal to the optical constant of the substrate for temperature estimation and different from the optical constant of the first semiconductor layer;

measuring a film thickness of the second semiconductor layer by a method of optical measurement and measuring a surface temperature of the second semiconductor layer;

calculating a rate of growth of the second semiconductor layer based on the film thickness of the second semiconductor layer thus measured to derive a relationship between the rate of growth of the second semiconductor layer and the surface temperature of the second semiconductor layer;

epitaxially growing a third semiconductor layer on a substrate for device fabrication made of a material identical to a material of the substrate for temperature estimation, the third semiconductor layer being made of a single crystal material having an optical constant that is different from the optical constant of the substrate for device fabrication, and then epitaxially growing a fourth semiconductor layer on the third semiconductor layer under a reaction control condition, the fourth semiconductor layer being made of a single crystal material having an optical constant that is substantially equal to the optical constant of the substrate for device fabrication and different from the optical constant of the third semiconductor layer;

measuring a film thickness of the fourth semiconductor layer by a method of optical measurement;

calculating a rate of growth of the fourth semiconductor layer based on the film thickness of the fourth semiconductor layer thus measured; and estimating a surface temperature of the fourth semiconductor layer based on the rate of growth of the fourth semiconductor layer thus calculated and a relationship.

2. The method of estimating substrate temperature according to claim 1, wherein the second semiconductor layer and the fourth semiconductor layer are each comprised of a semiconductor layer containing silicon (Si).

3. The method of estimating substrate temperature according to claim 2, wherein the second semiconductor layer and the fourth semiconductor layer each further contains germanium (Ge).

4. The method of estimating substrate temperature according to claim 2, wherein the second semiconductor layer and the fourth semiconductor layer each further contains carbon (C).

5. The method of estimating substrate temperature according to claim 3, wherein the second semiconductor layer and the fourth semiconductor layer each further contains carbon (C).

6. The method of estimating substrate temperature according to claim 1, wherein the substrate for temperature estimation, the second semiconductor layer, the substrate for device fabrication and the fourth semiconductor layer are each made of silicon (Si).

7. The method of estimating substrate temperature according to claim 1, wherein the second semiconductor layer is made of Si, and the first semiconductor layer is made of silicon germanium (SiGe).

8. The method of estimating substrate temperature according to claim 7, wherein the first semiconductor layer has a Ge composition ratio not less than 5% and a film thickness equal to or less than a critical film thickness thereof.

9. The method of estimating substrate temperature according to claim 1, wherein the second semiconductor layer is made of Si, and the first semiconductor layer is made of silicon germanium carbon (SiGeC).

10. The method of estimating substrate temperature according to claim 1, wherein the film thickness of the second semiconductor layer is measured with use of a spectroscopic ellipsometer.

11. The method of estimating substrate temperature according to claim 1, wherein the film thickness of the second semiconductor layer is measured with use of a spectral reflectometer.

12. The method of estimating substrate temperature according to claim 1, wherein:
- a plurality of fourth semiconductor layers are epitaxially grown on the third semiconductor layer under a reaction control condition;
- calculating the rate of growth of the fourth semiconductor layer, rates of growth of at least two of the plurality of fourth semiconductor layers are calculated; and
- estimating the surface temperature of the fourth semiconductor layer, surface temperatures of the at least two of the fourth semiconductor layers are estimated based on the rates of growth of the at least two of the fourth semiconductor layers thus calculated.

* * * * *